(12) United States Patent
Tabata et al.

(10) Patent No.: US 11,305,781 B2
(45) Date of Patent: Apr. 19, 2022

(54) VEHICLE CONTROL DEVICE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Hiromasa Tatsushiro, Toyota (JP); Kota Fujii, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 17/093,046

(22) Filed: Nov. 9, 2020

(65) Prior Publication Data
US 2021/0146936 A1    May 20, 2021

(30) Foreign Application Priority Data
Nov. 15, 2019 (JP) .............................. JP2019-207444

(51) Int. Cl.
| | | |
|---|---|---|
| F16H 61/00 | (2006.01) | |
| B60W 50/00 | (2006.01) | |
| F16H 61/02 | (2006.01) | |
| F16H 59/72 | (2006.01) | |
| G06N 20/00 | (2019.01) | |

(52) U.S. Cl.
CPC ......... B60W 50/0098 (2013.01); F16H 59/72 (2013.01); F16H 61/0204 (2013.01); G06N 20/00 (2019.01); B60W 2050/0088 (2013.01); B60W 2510/10 (2013.01); F16H 2061/0087 (2013.01)

(58) Field of Classification Search
CPC ..... B60W 50/0098; B60W 2050/0088; B60W 2510/10; B60W 2050/0082; B60W 60/0015; F16H 59/72; F16H 61/0204; F16H 2061/0087; F16H 61/00; F16H 59/38; F16H 63/34; F16H 2061/0075; G06N 20/00; B60K 6/365; B60K 6/445; B60K 6/547; Y02T 10/62; G06F 8/65
See application file for complete search history.

(56) References Cited

U.S. PATENT DOCUMENTS

| | | | |
|---|---|---|---|
| 6,546,321 B1 | 4/2003 | Ohkubo | |
| 8,700,360 B2 * | 4/2014 | Garimella | ........... F02D 41/1401 702/190 |
| 8,892,298 B2 * | 11/2014 | Paturle | ................. B60C 11/243 701/34.4 |

(Continued)

FOREIGN PATENT DOCUMENTS

| | | |
|---|---|---|
| JP | 2001-065399 A | 3/2001 |
| JP | 2009-035207 A | 2/2009 |
| JP | 5277584 B2 | 8/2013 |

*Primary Examiner* — Justin Holmes
(74) *Attorney, Agent, or Firm* — Oliff PLC

(57) ABSTRACT

A vehicle control device stores learning data to correct a parameter used in a control program for controlling a vehicle, determines whether or not a part controlled by the parameter has been replaced; and resets the learning data when determining that the part has been replaced. The vehicle control device determines whether or not the part has been replaced by identifying individuality of the part based on characteristics of a sensor output from a sensor provided in the part.

6 Claims, 8 Drawing Sheets

(56) References Cited

U.S. PATENT DOCUMENTS

| | | | |
|---|---|---|---|
| 2004/0154715 A1* | 8/2004 | Dufournier | B60C 11/24 |
| | | | 152/154.2 |
| 2016/0104330 A1* | 4/2016 | Rudenko | G07C 5/0808 |
| | | | 701/29.1 |
| 2021/0403014 A1* | 12/2021 | Bunazawa | B60W 50/045 |

* cited by examiner

| | | HYDRAULIC FRICTION-ENGAGING DEVICE | | | | | SOLENOID PATTERN | | | | | |
|---|---|---|---|---|---|---|---|---|---|---|---|---|
| | | C1 | C2 | B1 | B2 | F1 | SL1 | SL2 | SL3 | SL4 | SC1 | SC2 |
| P | | ○ | | | ○ | | ○ | | | ○ | ○ | ○ |
| Rev | | ○ | | | ○ | | ○ | | | ○ | ○ | ○ |
| N | | ○ | | | ○ | | ○ | | | | ○ | ○ |
| D | 1st | ○ | | | ○ | ○ | ○ | | | | ○ | ○ |
| | 2nd | ○ | | ○ | | | ○ | | ○ | | ○ | |
| | 3rd | ○ | ○ | | | | ○ | ○ | | | ○ | |
| | 4th | | ○ | ○ | | | | ○ | ○ | | ○ | |

| THROTTLE VALVE OPENING DEGREE θth[%] | CORRECTION VALUE CMP [A] LEARNED BY ON-ROAD LEARNING |
|---|---|
| 0-25 | ΔPc2-1 |
| 25-50 | ΔPc2-2 |
| 50-75 | ΔPc2-3 |
| 75-100 | ΔPc2-4 |

VEHICLE CONTROL DEVICE

CROSS-REFERENCE TO RELATED APPLICATION

This application claims priority to Japanese Patent Application No. 2019-207444 filed on Nov. 15, 2019, incorporated herein by reference in its entirety.

BACKGROUND

1. Technical Field

The present disclosure relates to a vehicle control device that performs learning of correcting a parameter used in a control program for controlling a vehicle.

2. Description of Related Art

There are known vehicle control devices that are configured to update a learned value stored in a storage unit and store the updated learned value, and that store an initial set value of the learned value in advance and, when part replacement information is input, rewrite the learned value relating to the replaced part to the initial set value. One example is the control device described in Japanese Patent Application Publication No. 2001-65399 (JP 2001-65399 A).

SUMMARY

In the vehicle control device described in JP 2001-65399 A, part replacement information is input manually. Therefore, if part replacement information fails to be input, the learned value relating to the replaced part will not be rewritten to the initial set value, which may degrade the controllability of the vehicle after replacement of the part.

The present disclosure has been contrived under these circumstances, and an object thereof is to provide a vehicle control device that automatically determines that a part has been replaced and appropriately executes learning upon replacement of the part to quickly mitigate degradation of the controllability of the vehicle after replacement of the part.

The gist of a first disclosure is as follows: A vehicle control device that performs learning to correct a parameter used in a control program for controlling a vehicle, the vehicle control device including (a) a storage unit that stores learning data obtained by the learning, (b) a replacement determining unit that determines whether or not a part controlled by the parameter has been replaced, and (c) a rewriting executing unit that resets the learning data stored in the storage unit when the replacement determining unit determines that the part has been replaced, wherein the replacement determining unit determines whether or not the part has been replaced by identifying the individuality of the part based on the characteristics of a sensor output from a sensor provided in the part.

The gist of a second disclosure is as follows: The vehicle control device of the first disclosure, wherein (a) a plurality of sensors is provided, and (b) the replacement determining unit determines that the part has been replaced based on simultaneous detection of changes in characteristics of sensor outputs respectively output from more than one of the sensors.

The gist of a third disclosure is as follows: The vehicle control device of the first or second disclosure, further including an IG determining unit that determines whether or not an ignition signal has been switched from an OFF signal that stops a travel driving force source to an ON signal that starts the travel driving force source, wherein the replacement determining unit determines whether or not the part has been replaced when the IG determining unit determines that the ignition signal has been switched from the OFF signal to the ON signal.

The gist of a fourth disclosure is as follows: The vehicle control device of any one of the first to third disclosures, wherein the replacement determining unit identifies the individuality of the part using artificial intelligence.

The gist of a fifth disclosure is as follows: The vehicle control device of any one of the first to fourth disclosures, wherein (a) the part is a transmission, and (b) the parameter is an oil pressure command value for controlling switching of the gear stage of the transmission.

The gist of a sixth disclosure is as follows: The vehicle control device of any one of the first to fifth disclosures, wherein the sensor is a rotation speed sensor.

The vehicle control device of the first disclosure includes (a) the storage unit that stores the learning data obtained by the learning, (b) the replacement determining unit that determines whether or not the part controlled by the parameter has been replaced, and (c) the rewriting executing unit that resets the learning data stored in the storage unit when the replacement determining unit determines that the part has been replaced. The replacement determining unit determines whether or not the part has been replaced by identifying the individuality of the part based on the characteristics of a sensor output from the sensor provided in the part. This vehicle control device automatically determines that the part has been replaced based on the characteristics of the sensor output, and when it is determined that the part has been replaced, resets the learning data stored in the storage unit. Thus, learning is appropriately executed upon replacement of the part, so that degradation of the controllability of the vehicle after replacement of the part is quickly mitigated.

The vehicle control device of the second disclosure is the vehicle control device of the first disclosure, wherein (a) a plurality of sensors is provided, and (b) the replacement determining unit determines that the part has been replaced based on simultaneous detection of changes in characteristics of sensor outputs respectively output from more than one of the sensors. Since the determination as to replacement of the part is made based on changes in characteristics of more than one sensor output, the reliability of the determination as to replacement of the part is enhanced.

The vehicle control device of the third disclosure is the vehicle control device of the first or second disclosure, further including the IG determining unit that determines whether or not the ignition signal has been switched from the OFF signal that stops the travel driving force source to the ON signal that starts the travel driving force source, wherein the replacement determining unit determines whether or not the part has been replaced when the IG determining unit determines that the ignition signal has been switched from the OFF signal to the ON signal. The part is replaced when the ignition signal is the OFF signal, i.e., while the travel driving force source is stopped. Therefore, determining whether or not the part has been replaced when the ignition signal is switched from the OFF signal to the ON signal can reduce the likelihood of failure to determine whether or not the part has been replaced.

The vehicle control device of the fourth disclosure is the vehicle control device of any one of the first to third disclosures, wherein the replacement determining unit identifies the individuality of the part using artificial intelligence. The use of artificial intelligence can enhance the capacity to identify the individuality of the part.

The vehicle control device of the fifth disclosure is the vehicle control device of any one of the first to fourth disclosures, wherein (a) the part is a transmission, and (b) the parameter is the oil pressure command value for controlling switching of the gear stage of the transmission. Thus, when it is determined that the transmission has been replaced, the oil pressure command value relating to the learning data stored in the storage unit is reset. Therefore, learning is appropriately executed upon replacement of the transmission, so that degradation of the controllability of the vehicle after replacement of the transmission can be quickly mitigated.

The vehicle control device of the sixth disclosure is the vehicle control device of any one of the first to fifth disclosures, wherein the sensor is a rotation speed sensor. The characteristics of a sensor output of the rotation speed sensor can be used as a basis for determining whether or not a rotating shaft or a gear on which the rotation speed sensor is disposed and the part that is integrally configured with the rotating shaft and the gear have been replaced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. In the following embodiment, the drawings are simplified or modified as necessary and do not necessarily exactly represent the dimensional ratios, shapes, etc. of parts.

Figure 1:
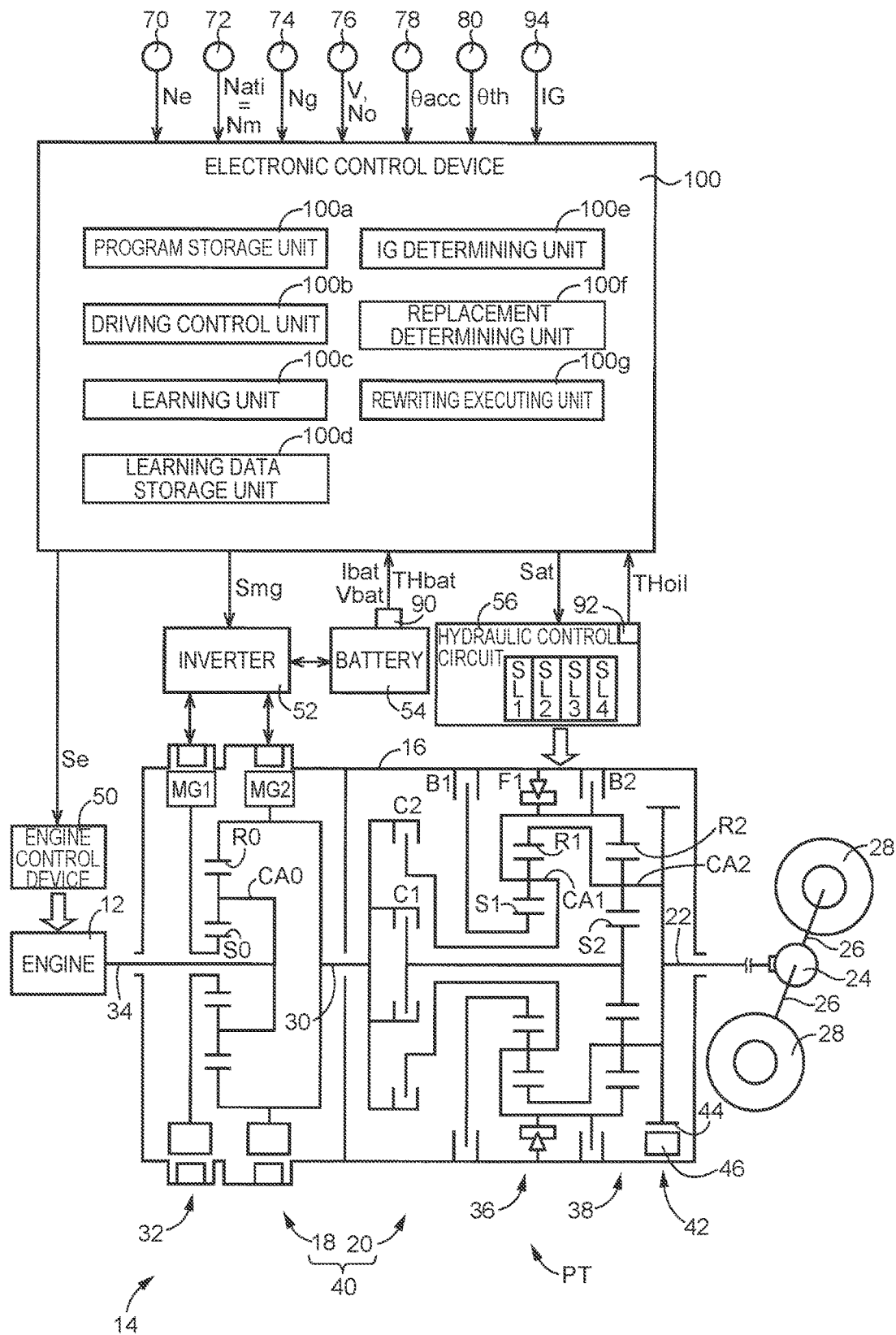
FIG. 1 is a schematic configuration diagram of a vehicle equipped with an electronic control device according to an embodiment of the present disclosure, and is a functional block diagram showing a main part of control functions for various types of control in the vehicle.

FIG. 1 is a schematic configuration diagram of a vehicle 10 equipped with an electronic control device 100 according to the embodiment of the present disclosure, and is a functional block diagram showing a main part of control functions for various types of control in the vehicle 10.

The vehicle 10 is a hybrid vehicle and includes an engine 12, a first rotating machine MG1, a second rotating machine MG2, a power transmission device 14, driving wheels 28, and the electronic control device 100.

The engine 12 is a travel driving force source of the vehicle 10 and formed by an internal combustion engine, such as a gasoline engine or a diesel engine. An engine torque Te [Nm] output from the engine 12 is controlled as an engine control device 50 including an electronic throttle valve, fuel injection equipment, and an ignition system is controlled by the electronic control device 100 to be described later.

The first rotating machine MG1 and the second rotating machine MG2 are, for example, rotating electrical machines that are so-called motor-generators having the functions of an electric motor (motor) and a power generator (generator). The first rotating machine MG1 and the second rotating machine MG2 can serve as travel driving force sources of the vehicle 10. Each of the first rotating machine MG1 and the second rotating machine MG2 is connected to a battery 54 provided in the vehicle 10 through an inverter 52 provided in the vehicle 10. As the inverter 52 is controlled by the electronic control device 100 to be described later, an MG1 torque Tg [Nm] output from the first rotating machine MG1 and an MG2 torque Tm [Nm] output from the second rotating machine MG2 are controlled. As to torques output from the rotating machines, for example, in the case of positive rotation, a positive torque that is on an acceleration side is a power running torque and a negative torque that is on a deceleration side is a regenerative torque. When the MG1 torque Tg and the MG2 torque Tm output from the first rotating machine MG1 and the second rotating machine MG2, respectively, are power running torques, power output from the first rotating machine MG1 and the second rotating machine MG2 is a vehicle driving force. ("Driving force" and "torque" are used synonymously with "power" when no particular distinction is made among these words.) The battery 54 gives and receives electricity to and from each of the first rotating machine MG1 and the second rotating machine MG2. The battery 54 is a chargeable-dischargeable secondary battery, such as a lithium-ion battery pack or a nickel-metal hydride battery pack. The first rotating machine MG1 and the second rotating machine MG2 are provided inside a transaxle case 16 that is a non-rotating member mounted on a vehicle body. The engine 12, the first rotating machine MG1, and the second rotating machine MG2 correspond to the "travel driving force source" in the present disclosure.

The power transmission device 14 includes an electrical stepless transmission section 18, a mechanical stepped transmission section 20, and others that are disposed in series on a common central axis inside the transaxle case 16. The stepless transmission section 18 is coupled to the engine 12 directly or indirectly through a damper or the like (not shown). The stepped transmission section 20 is coupled to an output side of the stepless transmission section 18. The power transmission device 14 includes a differential gear 24 coupled to an output shaft 22 that is an output rotating member of the stepped transmission section 20, and a pair of axles 26 coupled to the differential gear 24. In the power transmission device 14, power output from the engine 12 and the second rotating machine MG2 is transmitted to the stepped transmission section 20. The power transmitted to the stepped transmission section 20 is transmitted to the driving wheels 28 through the differential gear 24 etc. The power transmission device 14 thus configured is suitably used for front-engine, rear-wheel-drive (FR) vehicles. The stepless transmission section 18, the stepped transmission section 20, etc. are configured so as to be substantially symmetrical with respect to the common central axis. This common central axis is a central axis of a crankshaft of the engine 12, a coupling shaft 34 coupled to the crankshaft, or the like. The stepless transmission section 18, the stepped transmission section 20, the differential gear 24, and the pair of axles 26 in the power transmission device 14 constitute a power transmission path PT provided between the engine 12 and the driving wheels 28.

The stepless transmission section 18 includes a differential mechanism 32 as a power split device that mechanically divides power from the engine 12 toward the first rotating machine MG1 and an intermediate transmission member 30 that is an output rotating member of the stepless transmission section 18. The first rotating machine MG1 is a rotating machine to which power from the engine 12 is transmitted. The second rotating machine MG2 is connected to the intermediate transmission member 30 so as to be able to transmit power thereto. The intermediate transmission member 30 is coupled to the driving wheels 28 through the stepped transmission section 20, and therefore the second rotating machine MG2 is a rotating machine that is connected to the power transmission path PT, as well as to the driving wheels 28, so as to be able to transmit power thereto.

The differential mechanism 32 is a commonly known single-pinion planetary gear device including a sun gear S0, a carrier CA0, and a ring gear R0.

The stepped transmission section 20 is a mechanical transmission mechanism as a stepped transmission that constitutes a part of the power transmission path PT between the intermediate transmission member 30 and the driving wheels 28, i.e., an automatic transmission that constitutes a part of the power transmission path PT between the differential mechanism 32 and the driving wheels 28. The intermediate transmission member 30 functions also as an input rotating member of the stepped transmission section 20. The stepped transmission section 20 is a commonly known planetary-gear automatic transmission including, for example, a plurality of planetary gear devices, namely a first planetary gear device 36 and a second planetary gear device 38, and a plurality of engaging devices, namely a clutch C1, a clutch C2, a brake B1, a brake B2, and a one-way clutch F1. Hereinafter, the clutch C1, the clutch C2, the brake B1, and the brake B2 will be referred to simply as hydraulic friction-engaging devices CB when no particular distinction is made among them.

The hydraulic friction-engaging device CB is a hydraulically operated friction-engaging device formed by, for example, a multi-disc or single-disc clutch or a brake that is pressed by a hydraulic actuator, or a band brake that is tightened by a hydraulic actuator. As a hydraulic control circuit 56 provided in the vehicle 10 is controlled by the electronic control device 100 to be described later, the application state of each hydraulic friction-engaging device CB that is an engaged state, a released state, etc. is switched according to a regulated oil pressure output from the hydraulic control circuit 56.

The first planetary gear device 36 is a commonly known single-pinion planetary gear device including a sun gear S1, a carrier CA1, and a ring gear R1. The second planetary gear device 38 is a commonly known single-pinion planetary gear device including a sun gear S2, a carrier CA2, and a ring gear R2.

The differential mechanism 32, the first planetary gear device 36, the second planetary gear device 38, the hydraulic friction-engaging devices CB, the one-way clutch F1, the first rotating machine MG1, and the second rotating machine MG2 are coupled to one another as shown in FIG. 1.

An engagement torque that is the torque capacity of each hydraulic friction-engaging device CB is changed by a regulated engaging oil pressure that is output from each of linear solenoid valves SL1 to SL4 etc. in the hydraulic control circuit 56 provided in the vehicle 10.

In the stepped transmission section 20, one of gear stages that are different from one another in gear ratio γat (=AT input rotation speed Nati [rpm]/AT output rotation speed Nato [rpm]) is established as the combination of the application states of more than one hydraulic friction-engaging device CB is switched. The AT input rotation speed Nati is an input rotation speed of the stepped transmission section 20 and has the same value as the rotation speed of the intermediate transmission member 30 and an MG2 rotation speed Nm [rpm]. The AT output rotation speed Nato is the rotation speed of the output shaft 22 that is an output rotating member of the stepped transmission section 20, and is also an output rotation speed No [rpm] of a compound transmission 40 that is the entire transmission combining the stepless transmission section 18 and the stepped transmission section 20. The compound transmission 40 corresponds to the "transmission" and the "part" in the present disclosure.

Figure 2:
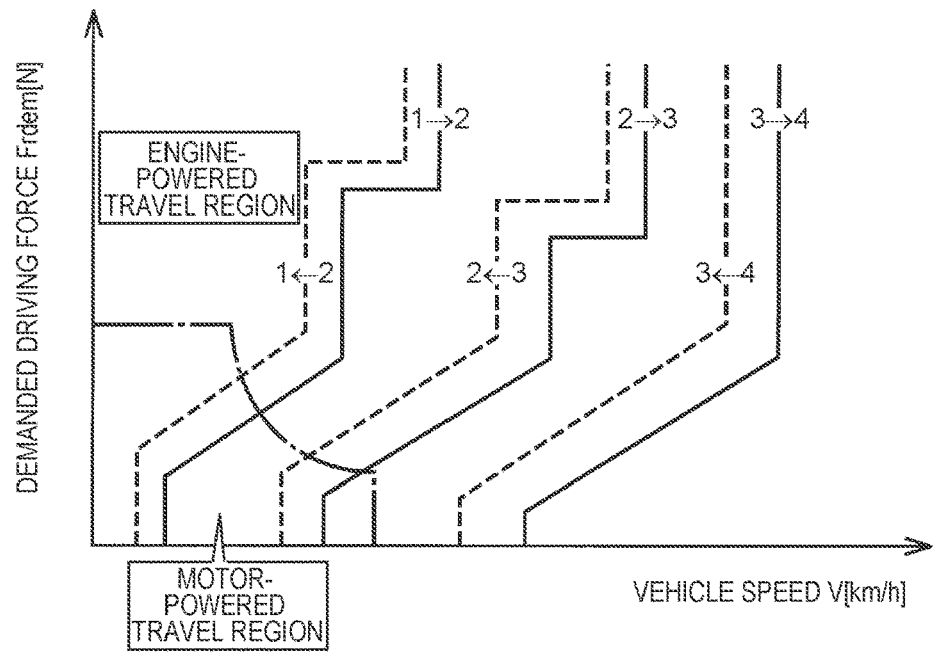
FIG. 2 is a graph showing one example of, and a relationship between, a gear shifting chart that is used for gear shifting control of a stepped transmission section and a power source switching map that is used for controlling switching between engine-powered travel and motor-powered travel.

FIG. 2 is a graph showing one example of, and a relationship between, a gear shifting chart that is used for gear shifting control of the stepped transmission section 20 and a power source switching map that is used for controlling switching between engine-powered travel and motor-powered travel. Engine-powered travel is a travel mode in which at least the engine 12 is used as a travel driving force source. Motor-powered travel is a travel mode in which the engine 12 is not used as a travel driving force source and the first rotating machine MG1 or the second rotating machine MG2 is used as a travel driving force source. As shown in FIG. 2, relationships (a gear shifting chart or a gear shifting map) represented by upshift lines (solid lines) and downshift lines (dashed lines), with a vehicle speed V [km/h] and a demanded driving force Frdem [N] as variables, are stored in advance. When a point specified by the actual vehicle speed V and demanded driving force Frdem that are variables crosses an upshift line (solid line) or a downshift line (dashed line), it is determined to start gear shifting control. Motor-powered travel is executed in a region indicated by the long dashed short dashed line where the engine efficiency is generally low, which is a low-vehicle-speed region where the vehicle speed V is relatively low or a low-load region where the demanded driving force Frdem is relatively low. Further, motor-powered travel is used when the state-of-charge (charge capacity) SOC [%] of the battery 54 connected to the second rotating machine MG2 through the inverter 52 is not lower than a predetermined value. Establishing a gear stage of the stepped transmission section 20 based on this gear shifting chart can achieve favorable fuel efficiency of the vehicle 10.

Figure 3:
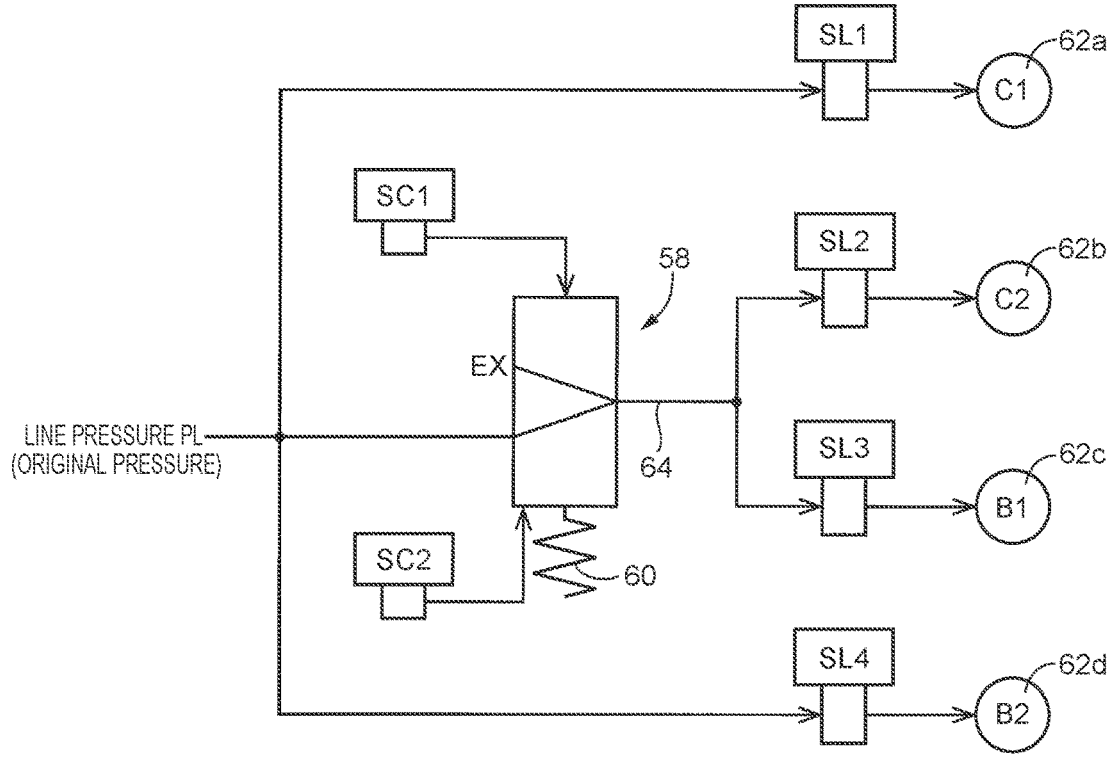
FIG. 3 is a hydraulic circuit diagram illustrating part of the configuration of a hydraulic control circuit that performs gear shifting control of the stepped transmission section.

FIG. 3 is a hydraulic circuit diagram illustrating part of the configuration of the hydraulic control circuit 56 that performs gear shifting control of the stepped transmission section 20.

The hydraulic control circuit 56 includes, as components for controlling the engagement torques of the hydraulic friction-engaging devices CB that are engaging elements provided in the stepped transmission section 20, the linear solenoid valve SL1, the linear solenoid valve SL2, the linear solenoid valve SL3, the linear solenoid valve SL4 (hereinafter referred to simply as "linear solenoid valves SL" when no particular distinction is made among them), a solenoid valve SC1, a solenoid valve SC2 (hereinafter referred to simply as "solenoid valves SC" when no particular distinction is made between them), and a switching valve 58.

The linear solenoid valve SL is an electromagnetic valve that, using a line pressure PL [Pa] regulated by, for example, a regulator valve (not shown) as an original pressure, outputs an oil pressure corresponding to an oil pressure control command signal Sat that is input from the electronic control device 100 (see FIG. 1), according to an electromagnetic force of a solenoid that is controlled based on the oil pressure control command signal Sat.

An oil pressure output from the linear solenoid valve SL1 is supplied to a hydraulic actuator 62*a* that controls the application state of the clutch C1. An oil pressure output from the linear solenoid valve SL2 is supplied to a hydraulic actuator 62*b* that controls the application state of the clutch C2. An oil pressure output from the linear solenoid valve SL3 is supplied to a hydraulic actuator 62*c* that controls the application state of the brake B1. An oil pressure output from the linear solenoid valve SL4 is supplied to a hydraulic actuator 62*d* that controls the application state of the brake B2.

Based on the oil pressure control command signal Sat input from the electronic control device 100, each solenoid valve SC switches between an ON state where the switching valve 58 outputs an oil pressure and an OFF state where the switching valve 58 does not output an oil pressure. The solenoid valves SC are preferably normally closed ON-OFF valves.

A state where an oil pressure is supplied from the solenoid valve SC1 and the solenoid valve SC2 will be referred to as an ON state, and a state where no oil pressure is supplied from the solenoid valve SC1 and the solenoid valve SC2 will be referred to as an OFF state. The switching valve 58 is provided with a spring 60 that urges a spool valve element in the switching valve 58. When the solenoid valve SC1 is in the OFF state and the solenoid valve SC2 is in the OFF state, the switching valve 58 is kept in the OFF state as the spool valve element in the switching valve 58 is urged by an urging force of the spring 60. When the solenoid valve SC1 is in the ON state and the solenoid valve SC2 is in the OFF state, the switching valve 58 is kept in the ON state as the spool valve element in the switching valve 58 is moved against the urging force of the spring 60. When the solenoid valve SC1 is in the ON state and the solenoid valve SC2 is in the ON state, the switching valve 58 is kept in the OFF state as the spool valve element in the switching valve 58 is urged by the urging force of the spring 60.

Thus, in the hydraulic control circuit 56 shown in FIG. 3, when the solenoid valve SC1 is in the ON state and the solenoid valve SC2 is in the OFF state, a supply source of the line pressure PL and an oil passage 64 between the linear solenoid valve SL2 and the linear solenoid valve SL3 communicate with each other. When both the solenoid valve SC1 and the solenoid valve SC2 are in the OFF state, or when both the solenoid valve SC1 and the solenoid valve SC2 are in the ON state, communication between the supply source of the line pressure PL (original pressure) and the oil passage 64 is interrupted while a drain port EX in the switching valve 58 and the oil passage 64 communicate with each other.

Figures 4, 5:
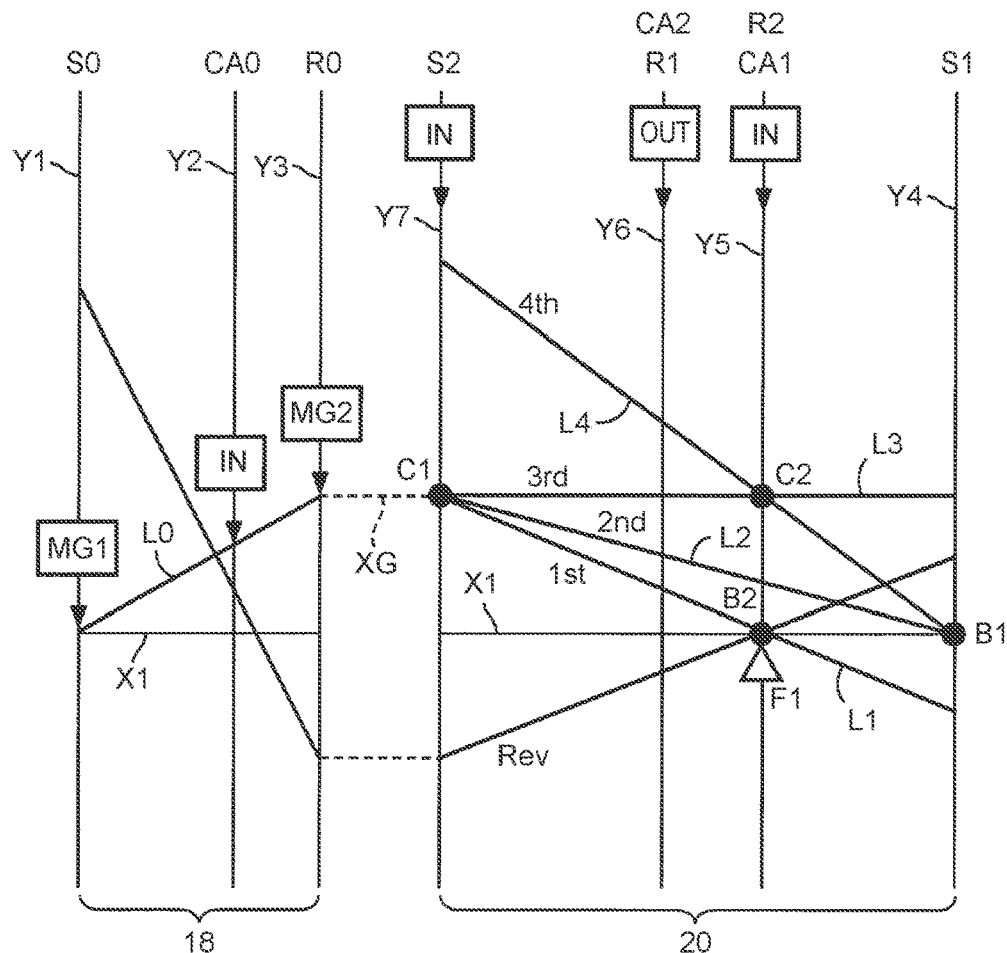
FIG. 4 is an actuation table showing, alongside each other, combinations of hydraulic friction-engaging devices to be actuated that are used to establish the respective gear stages in the stepped transmission section and combinations of solenoid patterns in the respective gear stages.
FIG. 5 is a nomogram in which relationships among the rotation speeds of rotating elements in a power transmission device that are coupled to one another in a different state in a different gear stage can be represented by straight lines.

FIG. 4 is an actuation table showing, alongside each other, combinations of the hydraulic friction-engaging devices CB to be actuated (combinations of the application states thereof) that are used to establish the respective gear stages in the stepped transmission section 20 and combinations of solenoid patterns in the respective gear stages. For the hydraulic friction-engaging devices shown in FIG. 4, circles represent an engaged state and blank cells represent a released state. For the solenoid patterns shown in FIG. 4, circles represent a state where an oil pressure is output and blank cells represent a state where no oil pressure is output.

In FIG. 4, "P," "Rev," "N," and "D" represent a parking range, a reverse range, a neutral range, and a drive range, respectively, one of which is selected by manual operation of a shift lever. The parking range and the neutral range are no-travel ranges that are selected not to cause the vehicle 10 to travel. The reverse range is a travel range that is selected to cause the vehicle 10 to travel backward. The drive range is a travel range that is selected to cause the vehicle 10 to travel forward. As the linear solenoid valves SL and the solenoid valves SC are controlled in accordance with the solenoid patterns shown in FIG. 4, the combination of the application states of the hydraulic friction-engaging devices CB is controlled. The range of the power transmission device 14 is switched and the gear stage established in the stepped transmission section 20 is switched, i.e., gears are shifted, according to the combination of the application states of the hydraulic friction-engaging devices CB.

FIG. 5 is a nomogram in which relationships among the rotation speeds of rotating elements in the power transmission device 14 that are coupled to one another in a different state in a different gear stage can be represented by straight lines. The nomogram shown in FIG. 5 is represented by two-dimensional coordinates, with the axis of abscissas showing relationships among gear ratios ρ of the differential mechanism 32, the first planetary gear device 36, and the second planetary gear device 38 and the axis of ordinates showing relative rotation speeds. The horizontal line X1 indicates zero rotation speed, and the horizontal line XG indicates the rotation speed of the intermediate transmission member 30.

The three vertical lines Y1, Y2, Y3 indicate, from the left side, the relative rotation speeds of the sun gear S0, the carrier CA0, and the ring gear R0, respectively, and the intervals of the three vertical lines Y1 to Y3 are determined according to the gear ratio of the differential mechanism 32. The four vertical lines Y4, Y5, Y6, Y7 indicate, from the right side, the relative rotation speeds of the sun gear S1, the carrier CA1 and the ring gear R2, the ring gear R1 and the carrier CA2, and the sun gear S2, respectively, and the intervals of the four vertical lines Y4 to Y7 are determined according to the gear ratios of the first planetary gear device 36 and the second planetary gear device 38.

As shown in FIG. 5, in the stepped transmission section 20, when the clutch C1 and the brake B2 (one-way clutch F1) are engaged, the rotation speed of the output shaft 22 in a first-speed gear stage (1st) is indicated by the point of intersection between the oblique straight line L1 that passes through the point of intersection between the vertical line Y7 and the horizontal line XG and the point of intersection between the vertical line Y5 and the horizontal line X1, and the vertical line Y6 that indicates the rotation speed of a rotating element coupled to the output shaft 22. The rotation speed of the output shaft 22 in a second-speed gear stage (2nd) is indicated by a point determined when the clutch C1 and the brake B1 are engaged, which is the point of intersection between the oblique straight line L2 and the vertical line Y6 indicating the rotation speed of the rotating element coupled to the output shaft 22. The rotation speed of the output shaft 22 in a third-speed gear stage (3rd) is indicated by a point determined when the clutch C1 and the clutch C2 are engaged, which is the point of intersection between the horizontal straight line L3 and the vertical line Y6 indicating the rotation speed of the rotating element coupled to the output shaft 22. The rotation speed of the output shaft 22 in a fourth-speed gear stage (4th) is indicated by a point determined when the clutch C2 and the brake B1 are engaged, which is the point of intersection between the oblique straight line L4 and the vertical line Y6 indicating the rotation speed of the rotating element coupled to the output shaft 22.

As described above, the gear stage established in the stepped transmission section 20 is switched as the combination of the hydraulic friction-engaging devices CB to be engaged is changed.

Figure 6:
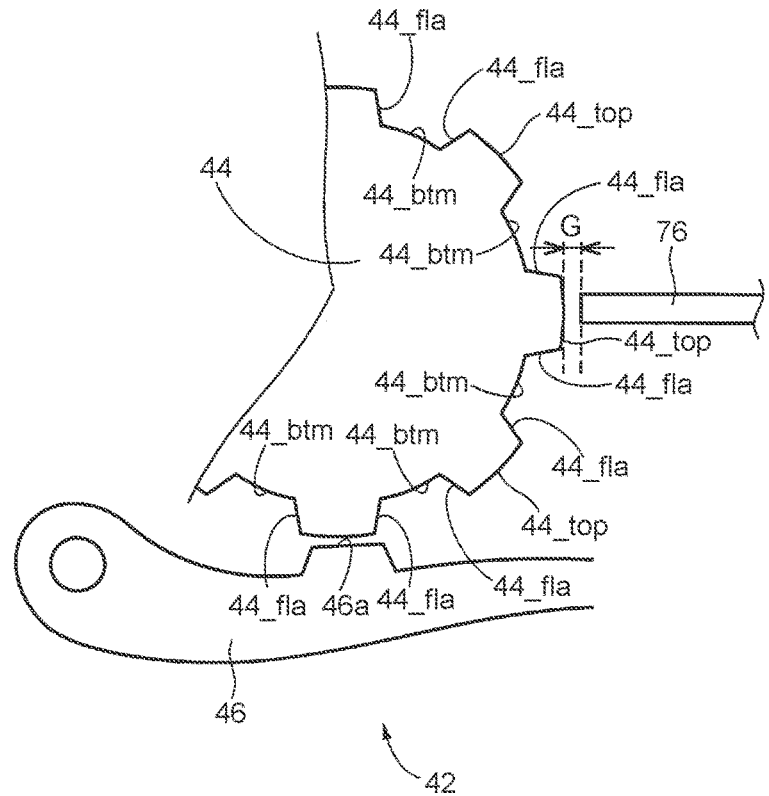
FIG. 6 is a view illustrating an example of the arrangement of a parking mechanism and a rotation speed sensor that is provided in a compound transmission.

As shown in FIG. 1, the vehicle 10 includes a parking mechanism 42. FIG. 6 is a view illustrating an example of the arrangement of the parking mechanism 42 and a rotation speed sensor 76 that is provided in the compound transmission 40.

The parking mechanism 42 is a commonly known mechanical parking mechanism including a parking gear 44 that is fixedly provided on the output shaft 22 so as not to rotate relatively thereto, and a parking pawl 46 serving as a locking tooth that meshes with the parking gear 44 to prevent rotation of the output shaft 22. The parking gear 44 is made of, for example, hardened steel (iron) that is a magnetic material. The parking gear 44 has tip surfaces 44_top, root surfaces 44_btm, and tooth flanks 44_fla. The tip surface 44_top is a surface that bounds a tooth tip of the parking gear 44. The root surface 44_btm is a surface at the bottom of a tooth space. The tooth flank 44_fla is a surface part of a tooth between the tip surface 44_top and the root surface 44_btm. When the parking range is selected by manual operation of a shift lever, a hook 46a of the parking pawl 46 meshes with the parking gear 44. When a range other than the parking range is selected by manual operation of the shift lever, meshing between the hook 46a of the parking pawl 46 and the parking gear 44 dissolves.

Figure 7:
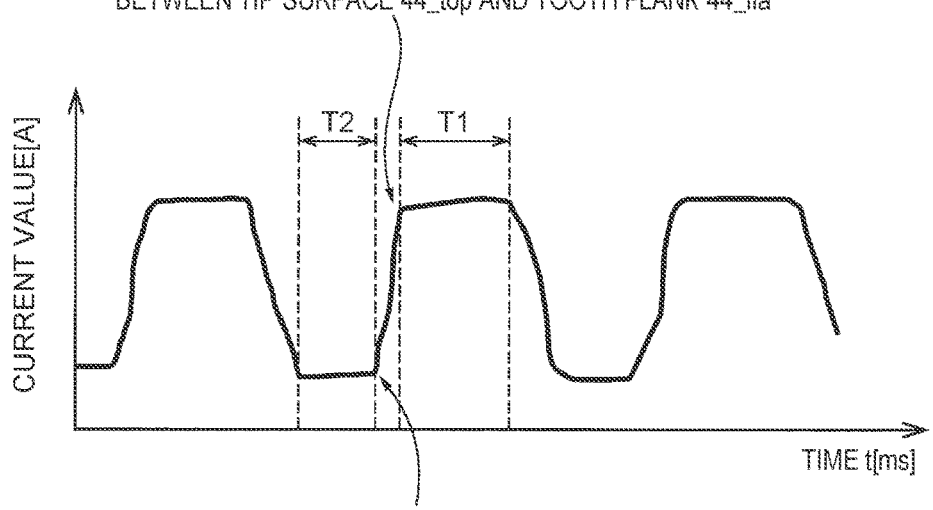
FIG. 7 is an example of the waveform of a sensor output from the rotation speed sensor shown in FIG. 6 for illustrating the characteristics of the sensor output.

The rotation speed sensor 76 is, for example, a magnetic sensor. The rotation speed sensor 76 is a sensor that is provided in the compound transmission 40 to detect the output rotation speed No, i.e., the rotation speed of the parking gear 44. For example, the rotation speed sensor 76 is disposed so as to face an outer circumferential surface of the parking gear 44 as shown in FIG. 6. When the output shaft 22 rotates, i.e., the parking gear 44 rotates, a gap distance G between the rotation speed sensor 76 and the parking gear 44 changes according to the tip surface 44_top and the root surface 44_btm of the parking gear 44 that face the rotation speed sensor 76. Thus, a sensor output (output signal) in which a current value is pulsed as shown in FIG. 7 is output from the rotation speed sensor 76. The repetition frequency in this pulsed sensor output is proportional to the rotation speed of the output shaft 22, and the rotation speed of the parking gear 44, i.e., the output rotation speed No is detected by signal processing, such as waveform shaping, pulse counting, or cycle measurement.

Each tooth of the parking gear 44 has a slightly different shape. Specifically, the shapes of the tip surface 44_top, the root surface 44_btm, a border portion between the tip surface 44_top and the tooth flank 44_fla, and a border portion between the root surface 44_btm and the tooth flank 44_fla in the parking gear 44 are different among the teeth, and have characteristics reflecting the individual difference of the parking gear 44. Therefore, characteristics reflecting the individual difference of the parking gear 44 also appear in the sensor output from the rotation speed sensor 76. The waveform of the sensor output from the rotation speed sensor 76 differs depending also on the distance at which the rotation speed sensor 76 is disposed relatively to the teeth of the parking gear 44 and on variation in detection performance of the rotation speed sensor 76 itself.

Since each tooth of the parking gear 44 has a slightly different shape, the same waveform appears once every number of the teeth of the parking gear 44 in the sensor output from the rotation speed sensor 76. As shown in FIG. 7, a period T1 corresponding to the width of the tip surface 44_top in a circumferential direction, a period T2 corresponding to the width of the root surface 44_btm in the circumferential direction, an output waveform corresponding to the shape of the border portion between the tip surface 44_top and the tooth flank 44_fla, the output waveform corresponding to the shape of the border portion between the root surface 44_btm and the tooth flank 44_fla, the shape of a rise in the output waveform corresponding to the shape of the tooth flank 44_fla, and the shape of a fall in the output waveform corresponding to the shape of the tooth flank 44_fla that correspond to the shapes of each tooth and each tooth space of the parking gear 44, as well as the order in which the output waveforms corresponding to the shapes of the respective teeth and tooth spaces appear, show the characteristics reflecting the individual difference of the parking gear 44, and different characteristics appear when the parking gear 44 is a different one.

Data that identifies the individuality of the parking gear 44 (hereinafter referred to as "parking gear identification data") is analyzed by the electronic control device 100 to be described later and stored in a replacement determining unit 100f at an early stage when the vehicle 10 is shipped from a factory and when the vehicle 10 of which the compound transmission 40 has been replaced and repaired is delivered. For example, normalization that involves extending or contracting waves to a uniform size such that the rotation speed of the parking gear 44, i.e., the output rotation speed No meets a predetermined rotation speed Nonom is performed on the waveform of the sensor output from the rotation speed sensor 76, and a characteristic part of the normalized sensor output that is a part reflecting the individual difference is analyzed and stored by the electronic control device 100. The predetermined rotation speed Nonom is a rotation speed that is determined in advance for normalization.

Like the rotation speed sensor 76, a rotation speed sensor 74 is a magnetic sensor. The rotation speed sensor 74 is a sensor that is provided in the compound transmission 40 to detect the rotation speed of the ring gear R0 (=MG2 rotation speed Nm). For example, the rotation speed sensor 74 is disposed so as to face an outer circumferential surface of a gear that is provided on an outer circumferential side of the ring gear R0. The ring gear R0 is made of, for example, hardened steel (iron) that is a magnetic material. A sensor output from the rotation speed sensor 74 shows characteristics reflecting the individual difference of the ring gear R0, and different characteristics appear when the ring gear R0 is a different one. Data that identifies the individuality of the ring gear R0 (hereinafter referred to as "ring gear identification data") is analyzed by the electronic control device 100 to be described later and stored in the replacement determining unit 100f at an early stage when the vehicle 10 is shipped from the factory and when the vehicle 10 of which the compound transmission 40 has been replaced and repaired is delivered.

The parking gear 44 is fixedly provided on the output shaft 22 that is a constituent member of the compound transmission 40 so as not to rotate relatively thereto, while the ring gear R0 is a member of a single planetary gear device that is the differential mechanism 32 provided in the compound transmission 40. Therefore, in a state where the compound transmission 40 is installed in the vehicle 10, the parking gear 44 and the ring gear R0 can be said to be integrally configured with the compound transmission 40.

As shown in FIG. 1, the vehicle 10 includes the electronic control device 100. The electronic control device 100 includes a so-called microcomputer having, for example, a CPU, RAM, ROM, input-output interface, and others. The CPU controls driving devices of the vehicle 10 including the engine 12, the first rotating machine MG1, the second rotating machine MG2, and the power transmission device 14 by performing signal processing in accordance with a program that is stored in the ROM in advance using a temporary storage function of the RAM. The electronic control device 100 corresponds to the "control device" in the present disclosure.

Input into the electronic control device 100 are various signals etc. (e.g., the engine speed Ne [rpm]; a MG1 rotation speed Ng [rpm] that is the rotation speed of the first rotating machine MG1; the MG2 rotation speed Nm [rpm] that is the rotation speed of the second rotating machine MG2; the output rotation speed No that is the rotation speed of the output shaft 22; an accelerator operation amount θacc [%] that is an operation amount of an accelerator pedal representing the extent of acceleration operation by a driver; a throttle valve opening degree θth [%]; a battery temperature THbat [° C.], a battery charge-discharge current Ibat [A], and a battery voltage Vbat [V] of the battery 54; a hydraulic fluid temperature THoil [° C.] inside the hydraulic control circuit 56; and the ignition signal IG that is a signal indicating whether to start or stop the travel driving force source) based on detection values of various sensors etc. (e.g., rotation speed sensors 70, 72, 74, 76, an accelerator operation amount sensor 78, a throttle valve opening degree sensor 80, a battery sensor 90, an oil temperature sensor 92, and an ignition switch 94 that is a switch for starting the travel driving force source) provided in the vehicle 10.

From the electronic control device 100, various command signals (e.g., an engine control command signal Se that is a command signal for controlling the engine 12, a rotating machine control command signal Smg that is a command signal for controlling each of the first rotating machine MG1 and the second rotating machine MG2, and the oil pressure control command signal Sat that is a command signal for controlling the application state of each hydraulic friction-engaging device CB) are output to the devices (e.g., the engine control device 50, the inverter 52, and the hydraulic control circuit 56) provided in the vehicle 10.

The electronic control device 100 functionally includes a program storage unit 100a, a driving control unit 100b, a learning unit 100c, and a learning data storage unit 100d.

The program storage unit 100a stores control programs for controlling the driving devices.

The driving control unit 100b executes operation control of the engine 12, the first rotating machine MG1, and the second rotating machine MG2, and executes gear shifting control of switching the gear stage of the stepped transmission section 20 of the power transmission device 14, in accordance with the control programs stored in the program storage unit 100a.

The learning unit 100c learns a correction value for correcting the value of a parameter used in a control program. The learned correction value is stored in the learning data storage unit 100d. The learning data storage unit 100d is formed by, for example, a non-volatile memory. In the driving control unit 100b, the value of the parameter that is the object of learning is corrected by the learned correction value, and a corrected learned value LRN is used in the control program as the parameter. The learning data storage unit 100d corresponds to the "storage unit" in the present disclosure.

In the following, learning of a driving current IDR [A] for the linear solenoid valve SL that controls switching of the gear stage of the stepped transmission section 20 will be described as a specific example of learning of a parameter used in a control program.

Figure 8:
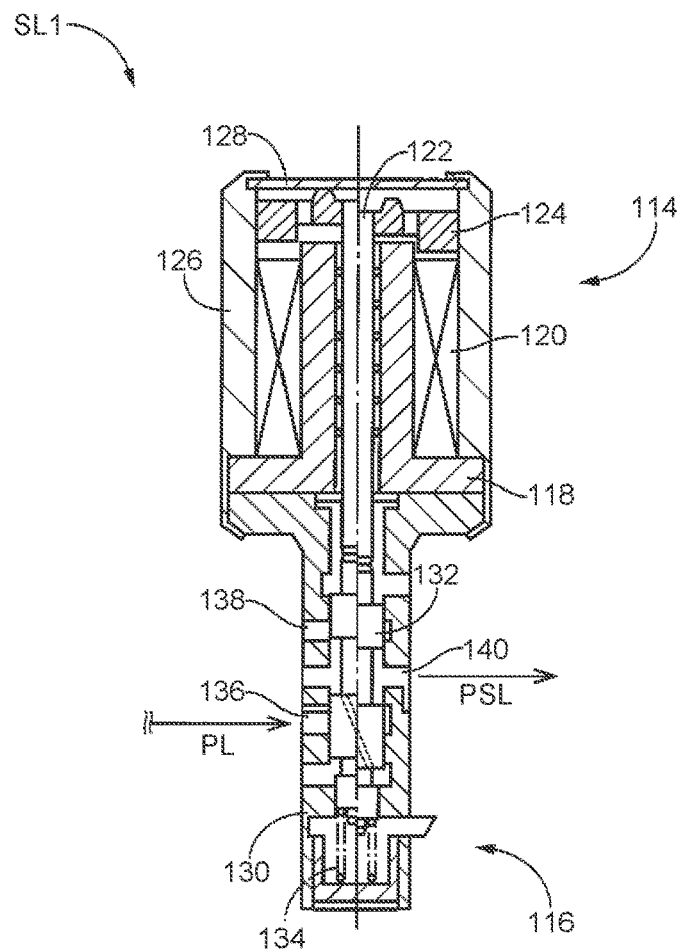
FIG. 8 is a sectional view illustrating the configuration of a linear solenoid valve provided in the hydraulic control circuit.

FIG. 8 is a sectional view illustrating the configuration of the linear solenoid valve SL provided in the hydraulic control circuit 56. The linear solenoid valves SL1 to SL4 provided in the hydraulic control circuit 56 have basically the same configuration; in FIG. 8, therefore, the linear solenoid valve SL1 is illustrated as a representative. The linear solenoid valve SL1 is composed of a solenoid 114 that is a device to which a current is applied and which then converts electric energy into a driving force, and a pressure regulating part 116 that is driven by the solenoid 114 to regulate the line pressure PL that is an input pressure and thereby generate a predetermined output pressure PSL [Pa].

The solenoid 114 includes a winding core 118, a coil 120, a core 122, a plunger 124, a case 126, and a cover 128. The winding core 118 has a cylindrical shape. The coil 120 is lead wire wound on an outer circumference of the winding core 118. The core 122 can move inside the winding core 118 in the direction of a central axis. The plunger 124 is fixedly provided at an end portion of the core 122 on the opposite side from the pressure regulating part 116. The case 126 houses the winding core 118, the coil 120, the core 122, and the plunger 124. The cover 128 is fitted in an opening of the case 126.

The pressure regulating part 116 has a sleeve 130, a spool valve element 132, and a spring 134. The sleeve 130 is fitted in the case 126. The spool valve element 132 is provided so as to be able to move inside the sleeve 130 in the direction of a central axis. The spring 134 urges the spool valve element 132 toward the solenoid 114. An end portion of the spool valve element 132 on the side of the solenoid 114 butts against an end portion of the core 122 on the side of the pressure regulating part 116.

In the linear solenoid valve SL1 thus configured, when a driving current IDR is applied to the coil 120, the plunger 124 is moved according to the current value in the direction of a central axis that is common to the core 122 and the spool valve element 132. As the plunger 124 is moved, the core 122 and also the spool valve element 132 are moved in the same direction. Thus, the flow rate of a hydraulic fluid input through an input port 136 and the flow rate of a hydraulic fluid discharged through a drain port 138 are adjusted. For example, based on the valve characteristics representing a relationship between the driving current IDR and the output pressure PSL shown in FIG. 9, the line pressure PL (original pressure) input through the input port 136 is regulated to a predetermined output pressure PSL corresponding to the driving current IDR and output through an output port 140.

Figure 9:
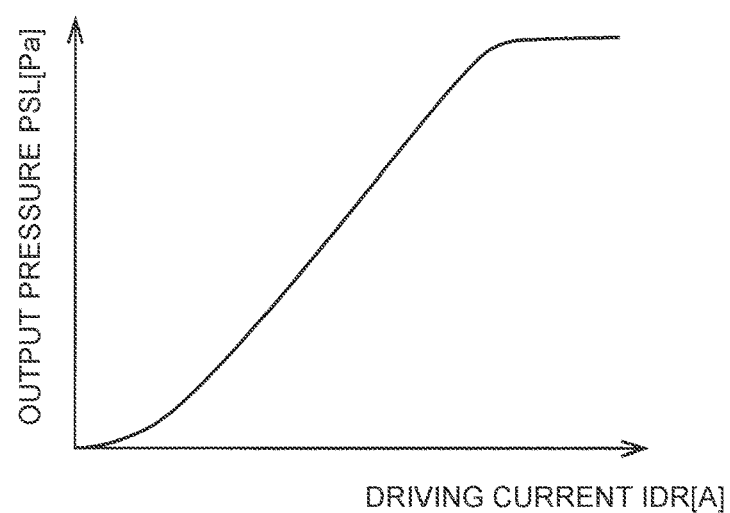
FIG. 9 is a graph showing an example of valve characteristics that represent a relationship between a driving current and an output pressure in the linear solenoid valve.
Figure 10:
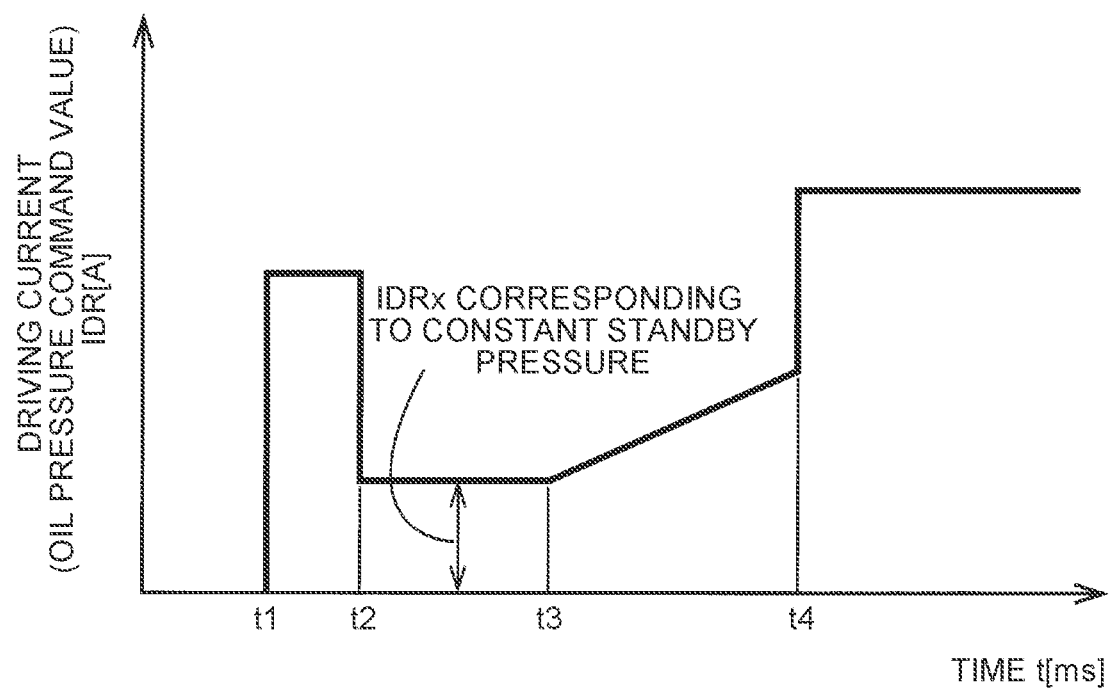
FIG. 10 is a time chart showing an example of an engaging action of the linear solenoid valve during gear shifting of the stepped transmission section, and illustrating how a driving current changes during a transitional period of engagement of a predetermined hydraulic friction-engaging device to be engaged at the time of gear shifting.

FIG. 10 is a time chart showing an example of an engaging action of the linear solenoid valve SL at the time of gear shifting of the stepped transmission section 20, and illustrating how the driving current IDR changes during a transitional period of engagement of a predetermined hydraulic friction-engaging device CB to be engaged at the time of gear shifting. Since the output pressure PSL of the linear solenoid valve SL is determined when the driving current IDR is specified as shown in FIG. 9, the driving current IDR can serve as an oil pressure command value for the output pressure PSL.

In the period from time t1 to time t2, the driving current IDR is temporarily increased for pack closing of closing a pack clearance. In the period from time t2 to time t3 (a period of constant standby pressure), the driving current IDR is maintained at a level corresponding to a constant standby pressure that is a state shortly before engagement. In the period from time t3 to time t4 (sweep period), the driving current IDR is gradually raised to gradually increase the engagement torque. At time t4 when it is determined that synchronization has been achieved, the driving current IDR is increased to a maximum value. The relationship between the driving current IDR and time t [ms] during the transitional period of engagement as shown in the time chart of FIG. 10 is a parameter used in a control program for gear shifting control.

The linear solenoid valves SL vary in valve characteristics, and the hydraulic friction-engaging devices CB vary in engagement characteristics. To reduce these variations in characteristics among the linear solenoid valves SL and the hydraulic friction-engaging devices CB, learning of correcting the driving current IDR to the linear solenoid valve SL is performed. For example, the driving current value IDRx [A] shown in FIG. 10 corresponding to the constant standby pressure of the hydraulic friction-engaging device CB to be engaged is used as a parameter that is the object of learning. The driving current value IDRx corresponding to the constant standby pressure of the hydraulic friction-engaging device CB to be engaged corresponds to the "oil pressure command value" in the present disclosure.

This learning consists of in-factory learning that is executed in the factory, with the engine 12 operating, before shipment of the vehicle 10 or delivery of the vehicle 10 of which the compound transmission 40 has been replaced and repaired, and on-road learning that is executed after the vehicle 10 is shipped from the factory or the repaired vehicle 10 is delivered, while the vehicle 10 is traveling.

In-factory learning is learning that involves outputting a standard value STN [A] as the driving current value IDRx to the linear solenoid valve SL and measuring the resulting shift shock, and then correcting the standard value STN so as to reduce the shift shock. This shift shock is attributable to tie-up of the stepped transmission section 20, a flare (racing) of the engine speed Ne, etc. For example, a flare amount (racing amount) Neblow [rpm] (see FIG. 11) that is an amount of flare of the engine speed Ne is detected as an amount of temporary rise in the engine speed Ne during a transitional period of gear shifting. By this in-factory learning, the driving current value IDRx is corrected from the standard value STN to a value obtained by adding an in-factory correction value to the standard value STN. The value obtained by adding the in-factory correction value to the standard value STN is stored in the learning data storage unit 100d as a pre-learning set value SET [A] that is a value before on-road learning.

When gear shifting is executed while the vehicle 10 is traveling, on-road learning is executed, based on the actual control result, about the driving current value IDRx for which the pre-learning set value SET is output to one of the linear solenoid valves SL1 to SL4 that is involved in gear shifting, i.e., that corresponds to the friction-engaging element to be released or engaged to shift gears. Specifically, whether or not a flare has occurred during gear shifting that has been executed is detected, and the driving current value IDRx for the linear solenoid valves SL is corrected so as to bring the detected flare amount closer to a predetermined target value. The flare amount and the predetermined target value will be described later.

In on-road learning, the amount of correction is calculated in each learning session, and learning of correcting the driving current value IDRx by the calculated correction amount is repeated each time gear shifting is executed while the vehicle 10 is traveling. By using a correction value CMP [A] that is a total value of the amounts of correction of the respective learning sessions in the case of repeated learning by on-road learning, the driving current value IDRx is corrected from the pre-learning set value SET to the learned value LRN [A] that is obtained by adding the correction value CMP to the pre-learning set value SET. The correction value CMP learned by on-road learning is stored in the learning data storage unit 100d. At the beginning of on-road learning, the correction value CMP is a zero value. On-road learning corresponds to "learning" in the present disclosure, and the correction value CMP corresponds to the "learning data" in the present disclosure. The learning data is stored as data showing the result of on-road learning.

Figure 11:
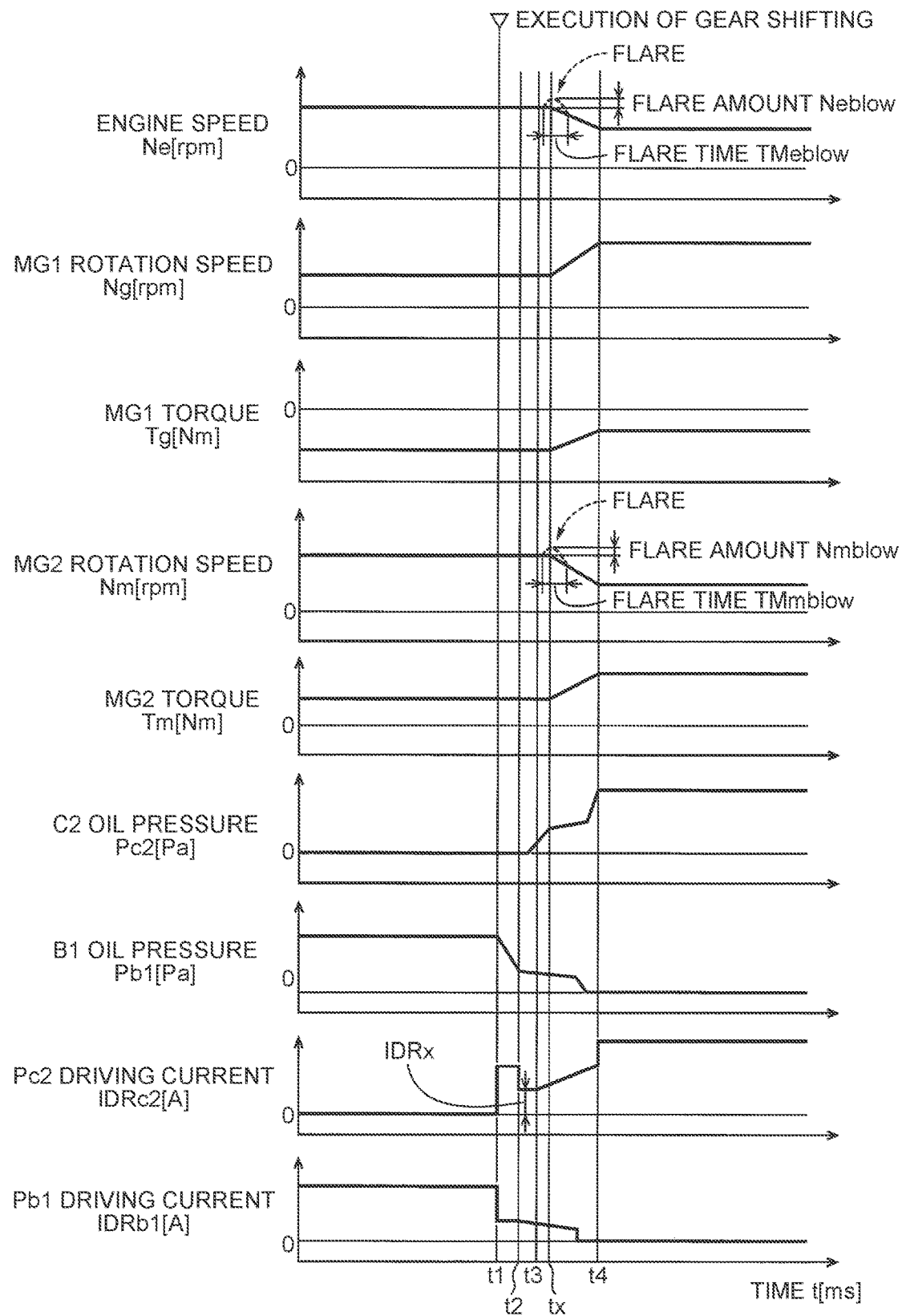
FIG. 11 is an example of a time chart of on-road learning in the case of gear shifting of the stepped transmission section from a second-speed gear stage to a third-speed gear stage.

FIG. 11 is one example of a time chart of on-road learning in the case of gear shifting of the stepped transmission section 20 from the second-speed gear stage to the third-speed gear stage. In FIG. 11, a state where no flare has occurred is indicated by a solid line, and a state where a flare has occurred is indicated by a dashed line. In FIG. 11, the axis of abscissas shows time t [ms] and the axis of ordinates shows, from the top, the engine speed Ne, the MG1 rotation speed Ng, the MG1 torque Tg, the MG2 rotation speed Nm, the MG2 torque Tm, a C2 oil pressure Pc2 [Pa] that is an oil pressure supplied to the hydraulic actuator 62b that controls the application state of the clutch C2, a B1 oil pressure Pb1 [Pa] that is an oil pressure supplied to the hydraulic actuator 62c that controls the application state of the brake B1, a Pc2 driving current IDRc2 [A] that is an oil pressure command value for the C2 oil pressure Pc2, and a Pb1 driving current IDRb1 [A] that is an oil pressure command value for the B1 oil pressure Pb1. The object of learning is the driving current value IDRx corresponding to the constant standby pressure at the Pc2 driving current IDRc2 of the C2 oil pressure Pc2 supplied to the hydraulic actuator 62b that controls the application state of the clutch C2 that is the hydraulic friction-engaging device to be engaged.

At time t1, execution of clutch-to-clutch shifting is started. In the period from time t1 to time t4, the Pc2 driving current IDRc2 to the hydraulic actuator 62b that controls the application state of the clutch C2 being the hydraulic friction-engaging device to be engaged is changed from a low state to a high state in accordance with the above-described time chart shown in FIG. 10. Meanwhile, during the period from time t1 to time t4, the Pb driving current IDRb1 to the hydraulic actuator 62c that controls the application state of the brake B1 being the hydraulic friction-engaging device to be released is gradually changed from a high state to a low state. On-road learning is executed such that at time tx (t1<tx<t4) during this clutch-to-clutch shifting (i.e., during control of switching of the gear stage of the stepped transmission section 20), the flare amount Neblow that is the amount of flare of the engine speed Ne is within a predetermined target range including predetermined target values Blowtgt [rpm]. The predetermined target range for the flare amount Neblow is a range that is set in advance through experiment or design so as to realize execution of such clutch-to-clutch shifting that shift shock and shift time are within allowable ranges.

Specifically, when the flare amount Neblow is larger than a target upper limit value Blowtgt2 [rpm] of the predetermined target range, it is inferred that there is a period in which neither of the brake B1 and the clutch C2 has a transmission torque due to a time lag between a releasing action of the brake B1 and an engaging action of the clutch C2. In this case, shift shock or prolongation of shift time may occur. In the next gear shifting, therefore, the driving current value IDRx is increased by the correction amount of one learning session from the value before the current session of learning by on-road learning such that the time lag between the releasing action of the brake B1 and the engaging action of the clutch C2 is eliminated or reduced. Thus, in the next gear shifting, the driving current value IDRx is increased from the current driving current value IDRx by the correction amount of one learning session.

Conversely, when the flare amount Neblow is smaller than a target lower limit value Blowtgt1 [rpm] of the predetermined target range, tie-up of both the brake B1 and the clutch C2 having a transmission torque occurs as the releasing action of the brake B1 and the engaging action of the clutch C2 coincide with each other, which may result in shift shock. In the next gear shifting, therefore, the driving current value IDRx is reduced by the correction amount of one learning session from the value before the current session of learning by on-road learning such that the tie-up is eliminated or mitigated. Thus, in the next gear shifting, the driving current value IDRx is reduced from the current driving current value IDRx by the correction amount of one learning session.

When the flare amount Neblow is within the predetermined target range, this means that execution of such clutch-to-clutch shifting that shift shock and shift time are within the allowable ranges is already realized, and therefore the driving current value IDRx is not corrected, i.e., not changed. Thus, the driving current value IDRx for the next gear shifting is set to the same value as that of the current gear shifting.

On-road learning is executed in the entire travel range, i.e., the entire range of the throttle valve opening degree θth (or the accelerator operation amount θacc), and is executed, for example, with the throttle valve opening degree θth (or the accelerator operation amount θacc) being divided into predetermined ranges. For each predetermined range, the correction value CMP that is a total value of the amounts of correction obtained by repeated learning is learned.

Figures 12, 13:
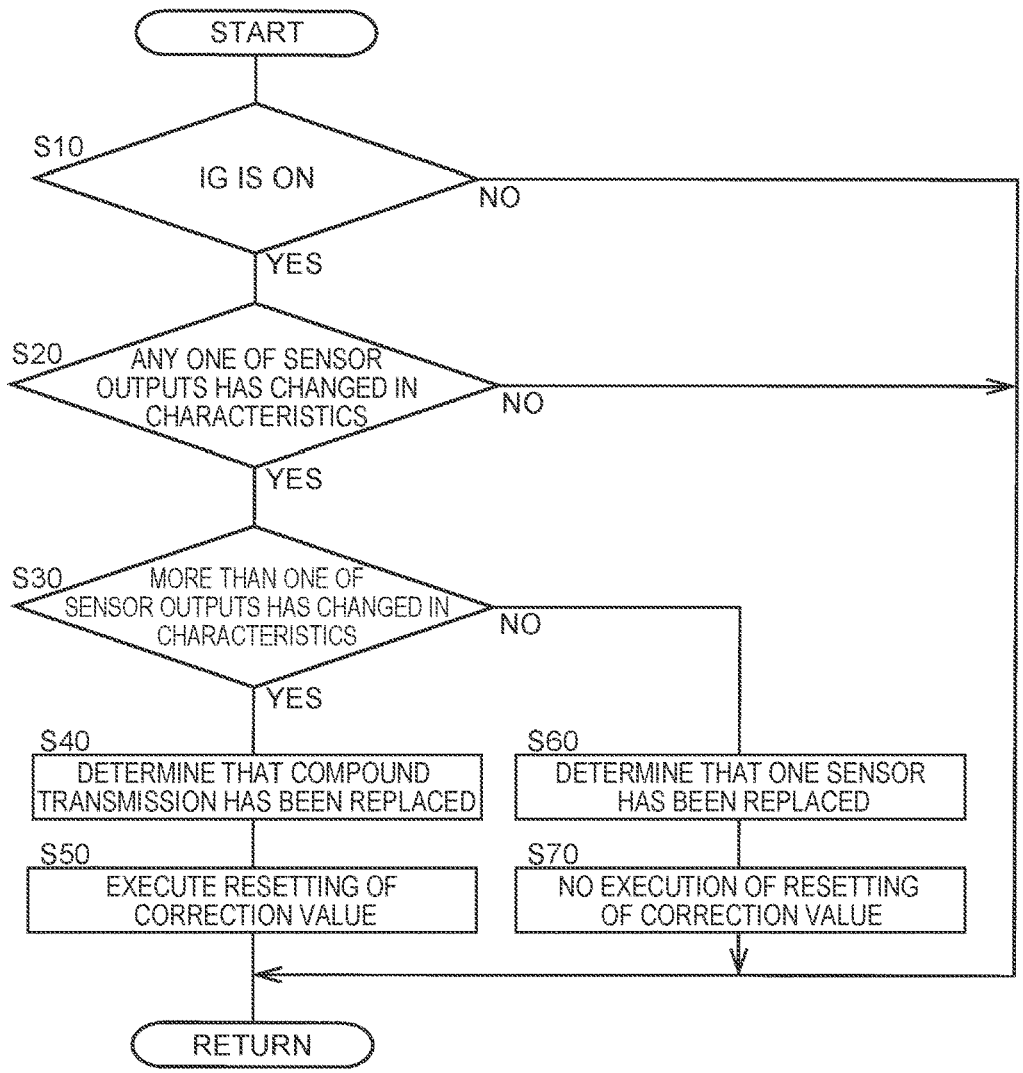
FIG. 12 is an example about a correction value for a driving current that has been learned with a throttle valve opening degree divided into predetermined ranges in the case of gear shifting of the stepped transmission section from the second-speed gear stage to the third-speed gear stage.
FIG. 13 is an example of a flowchart illustrating a main part of control operation of the electronic control device shown in FIG. 1.

FIG. 12 is an example of the correction value CMP for the Pc2 driving current value IDRc2 that has been learned with the throttle valve opening degree θth divided into predetermined ranges in the case of gear shifting of the stepped transmission section 20 from the second-speed gear stage to the third-speed gear stage. As shown in FIG. 12, for example, the throttle valve opening degree θth is divided into four predetermined ranges: a range of 0 [%] or larger but smaller than 25 [%]; a range of 25 [%] or larger but smaller than 50 [%]; a range of 50 [%] or larger but smaller than 75 [%]; and a range of 75 [%] or larger but smaller than 100 [%]. For the driving current value IDRx corresponding to each of these four divided predetermined ranges, the correction value CMP is learned as a value ΔPc2-1, a value ΔPc2-2, a value ΔPc2-3, or a value ΔPc2-4 by on-road learning. The driving current value IDRx that is the parameter used in the control program is corrected by each of the correction values CMP (the value ΔPc2-1, the value ΔPc2-2, the value ΔPc2-3, and the value ΔPc2-4) learned by on-road learning for the respective predetermined ranges. Not only when gears are shifted from the second-speed gear stage to the third-speed gear stage in the stepped transmission section 20 but also when gears are shifted between a different pair of gear stages, the driving current value IDRx corresponding to the constant standby pressure of the hydraulic friction-engaging device CB to be engaged serves as a parameter that is the object of learning for each predetermined range of the throttle valve opening degree θth. Thus, there is a plurality of parameters that serves as objects of learning, and the correction value CMP is learned for each of these parameters.

As shown in FIG. 1, the electronic control device 100 functionally includes an IG determining unit 100e, the replacement determining unit 100f, and a rewriting executing unit 100g.

The IG determining unit 100e determines whether or not the ignition signal IG has been switched from an OFF signal to an ON signal. When the ignition switch 94 is turned off, the ignition signal IG becomes the OFF signal that stops the travel driving force sources, so that the engine 12, the first rotating machine MG1, and the second rotating machine MG2 that are travel driving force sources are stopped. When the ignition switch 94 is turned on, the ignition signal IG becomes the ON signal that starts the travel driving force sources, so that the engine 12, the first rotating machine MG1, and the second rotating machine MG2 that are travel driving force sources are put in a state of being able to output a travel driving force.

The replacement determining unit 100f determines whether or not the sensor outputs output from the respective rotation speed sensors 74, 76 that are provided in the compound transmission 40 controlled by a parameter that is the object of learning have changed in characteristics.

For example, the above-described normalization is performed on the waveform of the sensor output from the rotation speed sensor 76. A characteristic part of the normalized sensor output that is a part reflecting the individual difference is compared with the stored parking gear identification data to thereby determine whether or not the sensor output has changed in characteristics. Similarly, the above-described normalization is performed on the waveform of the sensor output from the rotation speed sensor 74, and a characteristic part of the normalized sensor output that is a part reflecting the individual difference is compared with the stored ring gear identification data to thereby determine whether or not the sensor output has changed in characteristics.

When no change in characteristics is detected from either of the sensor outputs output from the respective rotation speed sensors 74, 76, it is identified that the individuality of neither of the ring gear R0 and the parking gear 44 that are objects to be detected by these sensors has changed, and the replacement determining unit 100f determines that none of the compound transmission 40 and the rotation speed sensors 74, 76 has been replaced.

When changes in characteristics are detected at the same time from the sensor outputs output from the respective rotation speed sensors 74, 76, it is identified that the individualities of both the ring gear R0 and the parking gear 44 that are objects to be detected by these sensors have changed, and the replacement determining unit 100f determines that the compound transmission 40 that is integrally configured with the ring gear R0 and the parking gear 44 has been replaced. That changes are detected "at the same time" means that, in detecting whether or not the sensor outputs output from the respective rotation speed sensors 74, 76 have changed in characteristics, changes in characteristics of both the sensor outputs are detected at least within the same period, if not at the same detection timing. Thus, simultaneity in the strict sense of the word is not required.

When a change in characteristics is detected from only one of the sensor outputs output from the respective rotation speed sensors 74, 76, it is identified that, of the individualities of the ring gear R0 and parking gear 44 that are objects to be detected by these sensors, the individuality of only one for which the sensor output has changed in characteristics has changed, and the replacement determining unit 100f determines that the compound transmission 40 has not been replaced and that only the rotation speed sensor of which the sensor output has changed in characteristics has been replaced.

As described above, when the sensor outputs output from the respective rotation speed sensors 74, 76 provided in the compound transmission 40 have changed in characteristics at the same time, the replacement determining unit 100f identifies that the individuality of the compound transmission 40 has changed, i.e., determines that the compound transmission 40 has been replaced. Thus, the replacement determining unit 100f determines whether or not the compound transmission 40 has been replaced by identifying the individuality of the compound transmission 40 based on the characteristics of the sensor outputs output from the respective rotation speed sensors 74, 76 provided in the compound transmission 40. Each of the rotation speed sensors 74, 76 corresponds to the "sensor" in the present disclosure.

When the replacement determining unit 100f determines that the compound transmission 40 has been replaced, the rewriting executing unit 100g resets the correction value CMP stored in the learning data storage unit 100d. When the replacement determining unit 100f determines that the compound transmission 40 has not been replaced, the rewriting executing unit 100g does not reset the correction value CMP stored in the learning data storage unit 100d. The meaning of "resetting the correction value CMP" includes returning the correction value CMP to the zero value that is the value at the beginning of on-road learning, as well as setting the correction value CMP to a predetermined value that is determined in advance so as to bring the correction value CMP closer to the zero value that is the value at the beginning of on-road learning. For example, this predetermined value is a value obtained by multiplying the correction value CMP shortly before being reset by a correction factor k ($0<k<1$).

FIG. 13 is one example of a flowchart illustrating a main part of control operation of the electronic control device 100 shown in FIG. 1. The flowchart of FIG. 13 is repeatedly executed.

In step S10 corresponding to the function of the IG determining unit 100e, it is determined whether or not the ignition signal IG has been switched from the OFF signal to the ON signal. When the determination result in step S10 is affirmative, step S20 is executed. When the determination result in step S10 is negative, the process returns to the start.

In step S20 corresponding to the function of the replacement determining unit 100f, it is determined whether or not at least one of the sensor outputs respectively output from more than one of the rotation speed sensors 74, 76 has changed in characteristics. When the determination result in step S20 is affirmative, step S30 is executed. When the determination result in step S20 is negative, the process returns to the start.

In step S30 corresponding to the function of the replacement determining unit 100f, it is determined whether or not both the sensor outputs respectively output from more than one of the rotation speed sensors 74, 76 have changed in characteristics. When the determination result in step S30 is affirmative, step S40 is executed. When the determination result in step S30 is negative, step S60 is executed.

In step S40 corresponding to the function of the replacement determining unit 100f, it is determined that the compound transmission 40 has been replaced (i.e., converted.) Then, step S50 is executed.

In step S50 corresponding to the function of the rewriting executing unit 100g, the correction value CMP is reset. Then, the process returns to the start.

In step S60 corresponding to the function of the replacement determining unit 100f, it is determined that the compound transmission 40 has not been replaced (i.e., not been converted) and that one of the rotation speed sensors 74, 76 has been replaced. Then, step S70 is executed.

In step S70 corresponding to the function of the rewriting executing unit 100g, the correction value CMP is not reset. Then, the process returns to the start.

In this embodiment, the electronic control device 100 includes (a) the learning data storage unit 100d that stores the correction value CMP learned by on-road learning, (b) the replacement determining unit 100f that determines whether or not the compound transmission 40 controlled by the parameter that is the object of learning has been replaced, and (c) the rewriting executing unit 100g that resets the correction value CMP stored in the learning data storage unit 100d when the replacement determining unit 100f determines that the compound transmission 40 has been replaced. The replacement determining unit 100f determines whether or not the compound transmission 40 has been replaced by identifying the individuality of the compound transmission 40 based on the characteristics of the sensor outputs output from the respective rotation speed sensors 74, 76 provided in the compound transmission 40. The electronic control device 100 automatically determines that the compound transmission 40 has been replaced based on the characteristics of the sensor outputs, and when it is determined that the compound transmission 40 has been replaced, resets the correction value CMP stored in the learning data storage unit 100d. Thus, on-road learning is appropriately executed upon replacement of the compound transmission 40, so that degradation of the controllability of the vehicle 10 after replacement of the compound transmission 40 is quickly mitigated.

In this embodiment, (a) the compound transmission 40 is provided with a plurality of sensors, namely the rotation speed sensors 74, 76, and (b) the replacement determining unit 100f determines that the compound transmission 40 has been replaced based on simultaneous detection of changes in characteristics of the sensor outputs respectively output from more than one of the rotation speed sensors 74, 76. Since the determination as to replacement of the compound transmission 40 is made based on changes in characteristics of more than one sensor output, the reliability of the determination as to replacement of the compound transmission 40 is enhanced.

In this embodiment, the electronic control device 100 further includes the IG determining unit 100e that determines whether or not the ignition signal IG has been switched from the OFF signal that stops the travel driving force source to the ON signal that starts the travel driving force source, and the replacement determining unit 100f determines whether or not the compound transmission 40 has been replaced when the IG determining unit 100e determines that the ignition signal IG has been switched from the OFF signal to the ON signal. The compound transmission 40 is replaced when the ignition signal IG is the OFF signal, i.e., while the travel driving force source is stopped. Therefore, determining whether or not the compound transmission 40 has been replaced when the ignition signal IG is switched from the OFF signal to the ON signal can reduce the likelihood of failure to determine whether or not the compound transmission 40 has been replaced.

In this embodiment, (a) the part for which determination as to replacement is made is the compound transmission 40 that is a transmission, and (b) the parameter that is the object of learning is the driving current value IDRx for controlling switching of the gear stage of the compound transmission 40. Thus, when it is determined that the compound transmission 40 has been replaced, the correction value CMP relating to the driving current value IDRx stored in the learning data storage unit 100d is reset. Therefore, on-road learning is appropriately executed upon replacement of the compound transmission 40, so that degradation of the controllability of the vehicle 10 after replacement of the compound transmission 40 is quickly mitigated.

In this embodiment, the sensors provided in the compound transmission 40 are the rotation speed sensors 74, 76. The characteristics of the sensor outputs output from the respective rotation speed sensors 74, 76 can be used as a basis for determining whether or not the parking gear 44 and the ring gear R0 on which the rotation speed sensors 74, 76 are disposed and the compound transmission 40 that is integrally configured with the parking gear 44 and the ring gear R0 have been replaced.

While the embodiment of the present disclosure has been described in detail above based on the drawings, the disclosure can also be implemented with other aspects.

In the above-described embodiment, the compound transmission 40 is provided with the two rotation speed sensors 74, 76, but the present disclosure is not limited to this aspect. For example, the compound transmission 40 may be provided with one rotation speed sensor or three or more rotation speed sensors. The replacement determining unit 100f may be configured to determine that the compound transmission 40 has been replaced when a change in characteristics of the sensor output from at least one rotation speed sensor is detected, regardless of whether the compound transmission 40 is provided with one rotation speed sensor or a plurality of rotation speed sensors. Also in this configuration, that the compound transmission 40 has been replaced is automatically determined based on the characteristics of the sensor output, and when it is determined that the compound transmission 40 has been replaced, the correction value CMP stored in the learning data storage unit 100d is reset. Thus, on-road learning can be appropriately executed upon replacement of the compound transmission 40. In the case where the compound transmission 40 is provided with a plurality of rotation speed sensors, it is preferable that the replacement determining unit 100f be configured to determine that the compound transmission 40 has been replaced when changes in characteristics of the sensor outputs output from the respective rotation speed sensors are detected at the same time. Since the determination as to replacement of the compound transmission 40 is made based on simultaneous detection of changes in characteristics of more than one sensor output, the reliability of the determination as to replacement of the compound transmission 40 is enhanced.

In the above embodiment, the rotation speed sensors 76, 74 are disposed so as to face the teeth of the gears such as the parking gear 44 and the ring gear R0, respectively, but the present disclosure is not limited to this aspect. For example, a rotation speed sensor may be disposed so as to face the teeth of a spline of a cylinder of the clutch C1 that is a hydraulic friction-engaging device. The rotation speed may be detected by a sensor output that is output from the rotation speed sensor according to the shape of the teeth of the spline, and the individuality of the clutch C1 may be identified based on the characteristics of the sensor output.

In the above-described embodiment, identification of the individualities of the parking gear 44, the ring gear R0, and the compound transmission 40 is determined by the replacement determining unit 100f, but this determination may instead be performed by so-called artificial intelligence. Artificial intelligence acquires a pattern recognition capacity (in the above-described embodiment, the capacity to identify the characteristics of a sensor output) in the course of learning on its own by, for example, machine learning or deep learning, without being explicitly programmed. Some of the functions of artificial intelligence may be provided outside the vehicle 10, for example, in a server.

In the above-described embodiment, the parameter that is the object of learning is the driving current value IDRx corresponding to the constant standby pressure of the hydraulic friction-engaging device to be engaged during clutch-to-clutch shifting, but the present disclosure is not limited to this aspect. For example, the parameter may be the driving current IDR for pack closing in the period from time t1 to time t2 shown in the time chart of FIG. 10, or may be the length of the period from time t1 to time t2 in which the driving current IDR for pack closing is output, or the length of the period from time t2 to time t3 in which the constant standby pressure is output. Further, the parameter that is the object of learning is not limited to one relating to the hydraulic friction-engaging device to be engaged; the parameter may also be, for example, a fuel injection amount, fuel injection timing, or ignition timing in the engine control device 50 that controls the engine 12. Thus, the term "parameter" refers to a control value for directly or indirectly controlling a part (e.g., the compound transmission 40 or the engine 12), and the operation of the part controlled is changed as this control value is corrected by on-road learning.

In the above-described embodiment, the learning unit 100c executes on-road learning based on the flare amount Neblow that is an amount of flare of the engine speed Ne, but the present disclosure is not limited to this aspect. For example, the learning unit 100c may execute on-road learning such that, instead of the flare amount Neblow, at least one of a flare amount Nmblow [rpm] that is an amount of flare of the MG2 rotation speed Nm, a flare time (racing time) TMeblow [ms] that is a time of flare of the engine speed Ne, and a flare time TMmblow [ms] that is a time of flare of the MG2 rotation speed Nm, shown in FIG. 11, is within a predetermined target range thereof. The flare amount Nmblow is detected as an amount of temporary rise in the MG2 rotation speed Nm during a transitional period of gear shifting. The flare time TMeblow and the flare time TMmblow are detected as a time of temporary rise in the engine speed Ne and the MG2 rotation speed Nm, respectively, during a transitional period of gear shifting. The predetermined target range of each of the flare time TMeblow, the flare amount Nmblow, and the flare time TMmblow is a range that is set in advance through experiment or design so as to realize execution of such clutch-to-clutch shifting that shift shock and shift time remain within allowable ranges.

In the above-described embodiment, a learning guard value GD [A] for preventing erroneous learning in on-road learning is not provided, but it may be provided. Specifically, when the absolute value of the correction value CMP that is a total value of the amounts of correction of the respective learning sessions in the case of repeated learning by on-road learning exceeds a range specified by the learning guard value GD (>0) (i.e., when CMP<−GD or GD<CMP), the driving current value IDRx that is the object of learning is corrected by only a minimum value (−GD) or a maximum value (GD) in the specified range, i.e., by only the learning guard value GD. On the other hand, when the absolute value of the correction value CMP is within the range specified by the learning guard value GD (i.e., −GD≤CMP≤GD), correction of the driving current value IDRx by the correction value CMP is executed by on-road learning. The learning guard value GD specifies the upper limit value of the absolute value of the correction value CMP that is the sum of the amounts of correction resulting from repeated correction by on-road learning.

In the above-described embodiment, the "learning data" stored in the learning data storage unit 100d is the correction value CMP, but the present disclosure is not limited to this aspect. Instead of the correction value CMP, for example, the learned value LRN may be stored as the "learning data." Since the learned value LRN is a value obtained by adding the correction value CMP to the pre-learning set value SET, storing the pre-learning set value SET and the learned value LRN in the learning data storage unit 100d is equivalent to storing the result of on-road learning. In the case of this aspect, the rewriting executing unit 100g resets the learned value LRN instead of resetting the correction value CMP. The meaning of "resetting the learned value LRN" includes returning the learned value LRN to the pre-learning set value SET that is the value at the beginning of on-road learning, as well as setting the learned value LRN to a predetermined value that is determined in advance so as to bring the leaned value LRN closer to the pre-learning set value SET that is the value at the beginning of on-road learning. For example, this predetermined value is a value obtained by adding, to the pre-learning set value SET, a value obtained by multiplying the difference between the learned value LRN shortly before being reset and the pre-learning set value SET by the correction factor k (0<k<1).

In the above-described embodiment, the electronic control device 100 includes the learning data storage unit 100d, the IG determining unit 100e, the replacement determining unit 100f, and the rewriting executing unit 100g, but the present disclosure is not limited to this aspect. The electronic control device 100 and other control functions may, as necessary, be integrated into one electronic control device, or the electronic control device 100 may, as necessary, be functionally divided into a different electronic control device and an external memory.

In the above-described embodiment, the vehicle 10 is a hybrid vehicle, but the present disclosure is not limited to this aspect. For example, the vehicle 10 may also be a vehicle that has only the engine 12 as a travel driving force source.

What has been described above is merely an embodiment of the present disclosure. The disclosure can be implemented with various changes and improvements based on the knowledge of those skilled in the art made to the aspects thereof within the scope of the gist of the disclosure.

What is claimed is:

1. A vehicle control device that performs learning to correct a parameter used in a control program for controlling a vehicle, the vehicle control device comprising:
   a storage unit that stores learning data obtained by the learning;
   a replacement determining unit that determines whether or not a part controlled by the parameter has been replaced; and
   a rewriting executing unit that resets the learning data stored in the storage unit when the replacement determining unit determines that the part has been replaced, wherein
   the replacement determining unit determines whether or not the part has been replaced by identifying individuality of the part based on characteristics of a sensor output from a sensor provided in the part.

2. The vehicle control device according to claim 1, wherein:
   a plurality of sensors is provided; and
   the replacement determining unit determines that the part has been replaced based on simultaneous detection of changes in characteristics of sensor outputs respectively output from more than one of the sensors.

3. The vehicle control device according to claim 1, further comprising an IG determining unit that determines whether or not an ignition signal has been switched from an OFF signal that stops a travel driving force source to an ON signal that starts the travel driving force source, wherein the replacement determining unit determines whether or not the part has been replaced when the IG determining unit determines that the ignition signal has been switched from the OFF signal to the ON signal.

4. The vehicle control device according to claim 1, wherein the replacement determining unit identifies the individuality of the part using artificial intelligence.

5. The vehicle control device according to claim 1, wherein:
   the part is a transmission; and
   the parameter is an oil pressure command value for controlling switching of a gear stage of the transmission.

6. The vehicle control device according to claim 1, wherein the sensor is a rotation speed sensor.

* * * * *